United States Patent [19]
Akman et al.

[11] Patent Number: 4,957,687
[45] Date of Patent: Sep. 18, 1990

[54] METHOD FOR MAKING PROFILED PLASTIC TUBES SUCH AS CORRUGATED TUBES

[76] Inventors: Bulent Akman, Ruelle de la Poterne; Bernard de Curraize, 10, rue Barbier D'Aucourt, both of 52244 Langres, France

[21] Appl. No.: 668,947

[22] Filed: Nov. 7, 1984

[30] Foreign Application Priority Data

Nov. 7, 1983 [FR] France ................. 83 17639

[51] Int. Cl.⁵ .................. B28B 7/20; B29C 49/00; B29C 61/00; B29D 23/00
[52] U.S. Cl. ..................... 264/506; 264/535; 264/573; 264/230; 264/234; 264/318; 264/345; 264/DIG. 52
[58] Field of Search .............. 264/506, 507, 230, 234, 264/235, 318, 345, 346, DIG. 52, 535, 573

[56] References Cited

U.S. PATENT DOCUMENTS

| | | | |
|---|---|---|---|
| 2,983,961 | 5/1961 | Titterton et al. | 264/506 |
| 3,164,653 | 1/1965 | Inouye | 264/318 X |
| 3,225,129 | 12/1965 | Taylor et al. | 264/230 |
| 3,424,831 | 1/1969 | Spatz | 264/318 X |
| 3,602,945 | 9/1971 | Pope et al. | 264/507 X |
| 3,850,902 | 11/1974 | Metcalf et al. | 264/237 X |
| 4,522,770 | 6/1985 | Andersen | 264/230 X |

FOREIGN PATENT DOCUMENTS

| | | | |
|---|---|---|---|
| 46-35160 | 10/1971 | Japan | 264/230 |
| 54-139975 | 10/1979 | Japan | 264/230 |

Primary Examiner—Jan H. Silbaugh
Assistant Examiner—Karen Kutach
Attorney, Agent, or Firm—Cushman, Darby & Cushman

[57] ABSTRACT

A tube or hollow body of a plastic material having memory characteristics is formed in a mold body having interior undulations or grooves. Pressure is applied to the interior of the plastic tube, while the tube is at a temperature above its softening point, to expand the tube into the configuration of the interior of the mold body. The pressure is maintained while the tube is cooled. After cooling, the tube is extracted axially from the mold body, and is reheated to cause the tube, by virtue of its memory characteristics, to return to the shape it had while in the mold, thereby eliminating the distortion and stretching occurring during removal from the mold. The mold body can be a tubular corrugated casing or stainless steel with a relatively thin wall, which cannot be taken apart. End assemblies are provided to hold and seal the tube ends while the tube is expanded in the mold body, by pressure applied through one of the end assemblies. The preferred plastic material is PTFE (TEFLON).

12 Claims, 2 Drawing Sheets

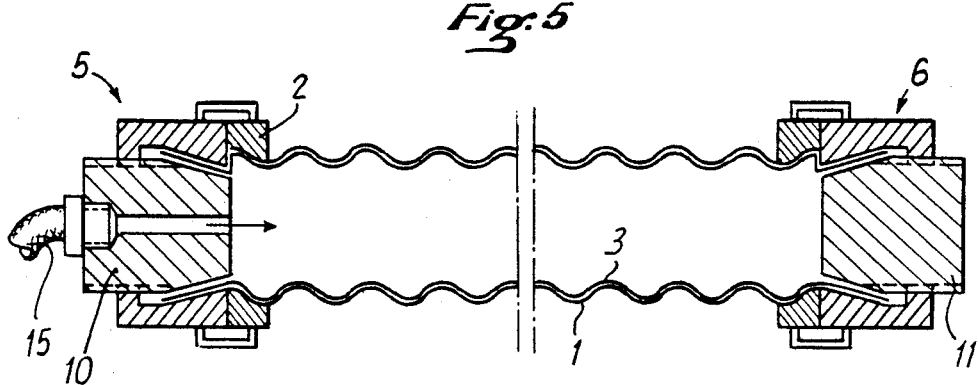
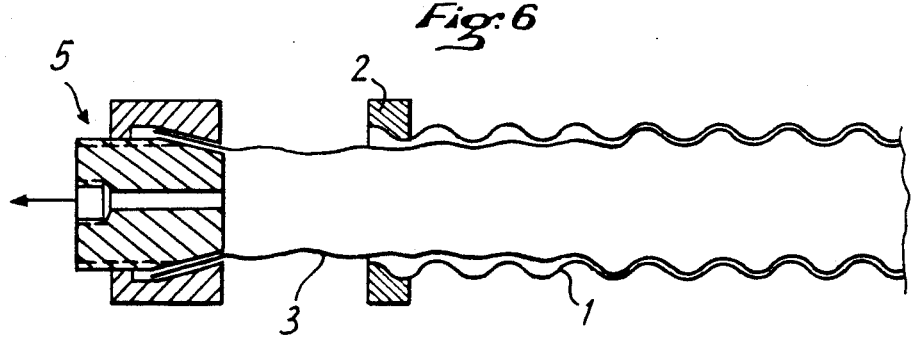
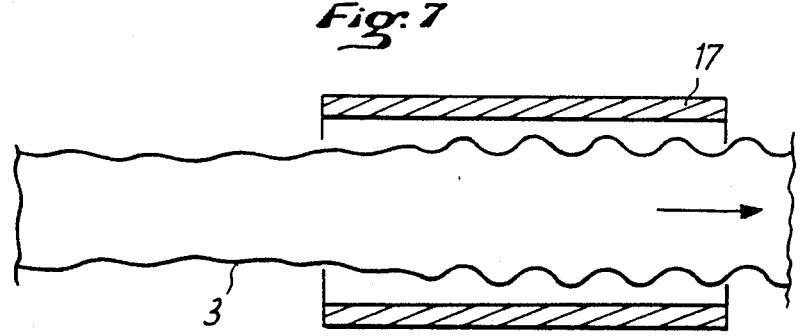

METHOD FOR MAKING PROFILED PLASTIC TUBES SUCH AS CORRUGATED TUBES

The present invention relates to a method of making profiled tubes or similar hollow bodies of a plastic material having memory characteristics when heated, in particular where the plastic is a fluorine-containing resin such as polytetrafluorethylene (PTFE).

More particularly, the method relates to making corrugated tubes of such plastic materials in which the corrugations can be helical or circumferential.

The invention also relates to an apparatus for implementing the method.

BACKGROUND OF THE INVENTION

Traditionally, such profiled tubes are made by molding them in relatively complex multi-part molds or, for example for flexible profiled tubes, by using a former mandrel with machined hollows or grooves with the tube pressed into the bottoms of the grooves of the former with a cable or other pressure applying device. These tools are expensive and the steps of the shaping process are relatively time consuming and complex.

The present invention provides a relatively rapid process, which uses relatively inexpensive tools, and which allows the manufacture of a wide range of shaped tubes of very different thicknesses and diameters, and in which the profiled tubes made have very good thermal stability.

The process according to the invention is essentially characterized by the fact that a tube made of a plastic material which has memory return characteristics when heated, is heated to a temperature slightly above the softening point, is placed in a mold whose internal shape essentially duplicates the desired final external shape for the tube, is subjected while hot and in the mold to an internal pressure to expand and press or plate the tube against the internal wall of the mold, so as to give it the profile shape of the mold, and the mold is cooled while internal pressure is maintained in the tube. The cooled tube is then pulled from the mold, but the profiled portions of the tube distort during such removal. The tube is then again heated to a temperature below the softening point, to return the tube, by virtue of its plastic memory, to the shape it had while in the mold.

The first heating step can be done while the tube is held in the mold, and is preferably carried out in a heated enclosure for a sufficient period of time to increase the temperature of the tube to above the softening point of the plastic material.

In practice, for thin tubes made of PTFE for which the softening point is 327° C. and for the usual range of profiled tube thicknesses between 0.1 and 6 mm, and diameters between 2 and 300 mm, the heating is carried out in an enclosure brought to a temperature slightly higher than the softening point, specifically around 350° C.

The cooling step during which the formation under pressure takes place is advantageously carried out over a period ranging from about 2 minutes to about 40 minutes, the final temperature reached by the tube before being removed from the mold being about 20° C.

The second heating phase which returns the tube to the shape acquired while in the mold, by plastic memory, is very short, and for tubes of the dimensions listed above, the heating time is between 5 seconds and about 10 minutes at a temperature about 10% lower than the softening temperature, particularly about 310° C., where the plastic material is PTFE.

If desired, the resultant shaped tubes can be reworked after cutting, to provide cylindrical ends by localized heating of the ends above the softening point, and then reforming the ends.

The resultant tubes have dimensional stability up to the softening temperature of the plastic material. In addition, the tubes retain such stability in the usual ranges of use for the resultant tubes, for example, for PTFE from −30° C. to +260° C.

The present invention also relates to apparatus for implementing the described method, this apparatus including a non-split unitary mold body comprising an elongated tubular body, whose internal wall has a shape similar to that which is desired for the tube and two end flanges each of which can be connected to an end assembly including plugs for holding the ends of the tube to be shaped and for sealing the interior of the tube when it is in the mold. At least one of the plugs has a port connectable to means for pressurizing the inside of the tube held in the mold.

The tubular body of the mold can advantagously be a simple, relatively thin wall metallic sheath, particularly of stainless steel, having a corrugated shape, in the form for example, of helical or parallel corrugations, the mold thus having a very low thermal mass allowing very short heating and cooling times.

Preferably, each end assembly has a casing unit including means for connection to the corresponding flange of the mold, and an internal, preferably frustoconical interior in which plugs of corresponding shape engage to hold the end of the tube between the outside of the plug and the inside of the casing unit, at least one of the plugs having a duct or port which can be connected to a source of fluid under pressure.

To implement the process decribed above using the apparatus according to the invention, a smooth tube slightly longer than the mold is placed in a mold of the type described, the tube is secured in the mold with the end assemblies, the assembly is placed in a heating enclosure for a period of time sufficient for the temperature of the tube to go beyond the softening point of the plastic material, the assembly is withdrawn from the heating enclosure while internal pressure is maintained in the tube through at least one of the plugs during cooling, then one of the end assemblies is removed and the tube is extracted from the mold by longitudinal traction by means of the other end assembly. Then, after removing the tube from the end assembly, the tube is placed in a heating enclosure to return it by plastic memory to the shape of the mold, and which was lost as a result of elongation during the step of extraction from the mold.

To better understand the invention, reference is made to the following description, as a non-limiting example of a preferred embodiment of the invention, with reference to the accompanying drawings.

BRIEF DESCRIPTION OF DRAWINGS

FIG. 5 shows forming the tube with internal pressure, and maintaining the pressure during cooling;

FIG. 6 shows the step of extracting or removing the cooled tube from the mold; and FIG. 7 shows the step of re-heating the tube to return the tube to the shape it had in the mold by virtue of its memory characteristics.

DETAILED DESCRIPTION

Figure 1:
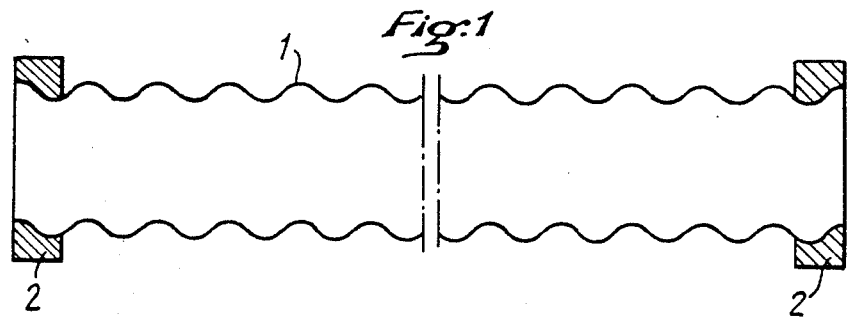
FIG. 1 is a schematic view in section showing a mold body which can be used to practice the method of this invention.
Figure 2:
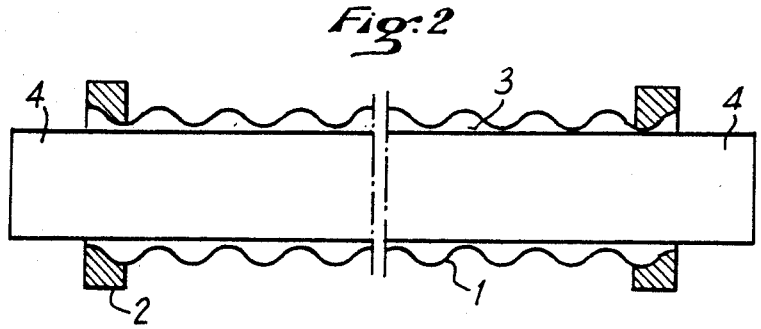
FIG. 2 shows a plastic tube inserted in the mold body of FIG. 1.

FIG. 1 shows a mold which can be used in accordance with the invention to form tubes having an undulating or corrugated profile. The corrugated profile can be ring-like corrugations or helical corrugation.

The mold is comprised of an elongated tubular one-piece or unitary body 1, for example, of stainless steel, and having flanges 2 fixed respectively to its opposite ends. In accordance with the invention, body 1 need not be a split or multi-part separable mold body.

The length and diameter as well as the profile form of the interior body 1 of the mold are selected to correspond to the characteristics of the profiled tube which is to be obtained.

As an example, a corrugated mold body 1 of stainless steel has a length of one meter, helicoidal undulations of a pitch of 3.5 mm, an internal passage or root diameter of 12.3 mm, an internal diameter between undulating peaks of 14.8 mm, a wall thickness of 1.5 mm, and an external diameter of undulating peaks of 17.8 mm.

In accordance with the method of this invention, there is placed in this mold body, a tube 3 of extruded PTFE, of an inside diameter of 10.5 mm, and an outside diameter of 12 mm (wall thickness of 0.75 mm). The tube 3 is of sufficient length so that its ends 4 extend beyond the flanges 2 of the mold.

Figure 3:
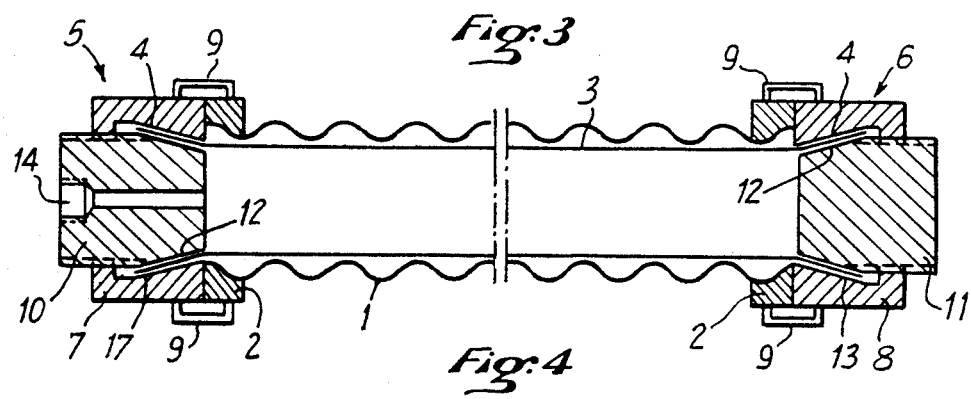
FIG. 3 shows the mold body with the tube therein and mold end assemblies in place.

The tube 3 is secured in the mold with the mold end assemblies 5 and 6. The assemblies 5 and 6 include the respective casings 7 and 8 which are secured to the respective end flanges 2 by locking bars 9. End plugs 10 and 11 are adapted to be threaded into the respective casings 7 and 8 as shown at FIG. 3. The inner end of plug 11 and plug 12 presents an external frustoconical surface 12 of a form corresponding to the internal frustoconical surface 13 of the respective casing 7 and 8.

Figure 4:
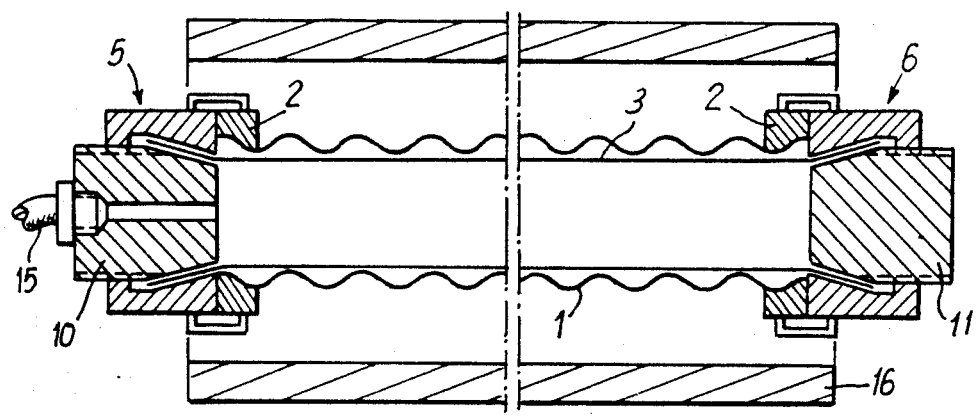
FIG. 4 shows the step of heating the assembly of FIG. 3.

As shown at FIG. 3, at least one of the plugs, for example the plug 10, has an internal port 14 for connection of a pipe or hose 15 (FIG. 4) which is connected to a source of fluid under pressure (not shown).

When the plugs 10 and 11 are threaded into the respective casings 7 and 8, the respective ends 4 of the tube 3 are clamped and sealed between the corresponding frustoconical surface 12 and 13 of the plugs and casing. The interface between casing 7 and 8 and flanges 2 can include vents to release air or gas from between the tube and the mold wall.

In the example under consideration, the assembly is heated to a temperature of 340° C. and is maintained at this temperature for about 40 minutes.

The assembly is then removed from the heater 16 and fluid under pressure is introduced through pipe 15 to the interior of tube 3 to force the tube while heated against the interior of the mold 1. Nitrogen under a pressure of 16 bars can be used. The tube is thus plated or plastered against the interior walls of the mold 1. The assembly of mold and tube is allowed to cool for about 30 minutes while the internal pressure is maintained in the tube.

Then, pressure is released and the end assemblies 5 and 6 are released from the corresponding mold flanges 2. Plug 11 is then removed from its casing 8 so that the right-hand end of the tube 3 is released. Then, as shown at FIG. 6, the end assembly 5, which still grips the left-hand end of tube 3 is pulled to the left in the direction of the arrow to forcibly extract the tube 3 from mold 1.

This longitudinal extraction causes the tube to elongate and the undulations or corrugations to distort and more or less disappear, because of the stretching during extraction.

After removing the end assembly 5 from the tube, the extracted tube is then placed in or passed through a heater 17 for about three minutes to heat the tube to a temperature of 300° C. By this heating the tube recovers the undulated profile from it had while under pressure in the mold body (FIG. 5), because of the memory characteristics of PTFE. The tube is then cooled to ambient temperature. The tube obtained has an inside passage diameter of 10.5 mm and undulations or corrugations of an outside diameter of 14.8 mm. The thickness of the tube varies from 0.5 to 0.65 mm and the thread or undulation pitch is 4 mm.

Cooling and heating tests of the finished tubes at temperatures between −30° C. and +260° C., with return of the tube to ambient temperature after each test, show that the tube has perfect thermal stability in the temperature range of −30° C. to +260° C., and the form of the undulations is virtually completely retained.

While a preferred embodiment of the invention has been described in combination with a particular apparatus, it is believed evident that it is not limiting and that numerous variations and modifications can be made without departing from the scope and spirit of the invention.

In particular, it is clear that the invention is not limited to PTFE plastic materials, but can be used with tubes of other plastic materials which have memory characteristics.

We claim:

1. A method of making profiled hollow bodies from a plastic material having memory return characteristics upon heating comprising the steps of positioning a tube of memory characteristic plastic material in a hollow mold body having an internal surface corresponding to the desired external profile shape of the tube, applying internal fluid pressure to the tube while the tube is at a temperature above its softening point to deform the tube against the inner surface of the mold body, cooling the tube while within the mold body and while maintaining the internal pressure, releasing the internal pressure after cooling, removing the tube from the mold body by pulling the tube axially out of the mold body, and then heating the tube to a temperature sufficient to cause the memory characteristics of the plastic material to return the tube to substantially the same profile as the internal surface of the mold body, to thereby substantially eliminate the stretching and deformations caused by pulling the tube out of the mold body.

2. The method of claim 1 wherein the step of heating the tube after removing it from the mold comprises heating the tube to a temperature lower than the softening point of the memory plastic material.

3. The method of claim 1 wherein the plastic material of the tube is PTFE, internal pressure is applied to the tube in the mold body while the tube is at a temperature above about 327° C., and the step of heating the tube after removal from the mold comprises heating the tube to a temperature above about 310° C., but less than about 327° C.

4. The method of claim 1 wherein the step of applying internal fluid pressure to the tube comprises sealing the ends of the tube, and then applying the internal pressure through a port communicating with the interior of the tube.

5. The method of claim 4 wherein the step of sealing the ends of the tube comprises positioning at least one end of the tube in a body having a frustoconical interior surface, and inserting a plug into the tube to clamp a peripheral wall portion of the tube between the body and the plug to seal the plug against the interior of the clamped peripheral wall portion of the tube.

6. The method of claim 5 wherein the step of positioning the at least one end of the tube in a body comprises, positioning the end in the body of a mold end assembly.

7. The method of claim 4 wherein the step of sealing the ends of the tube comprises, positioning each of the ends of the tube in a body having a frustoconical interior surface, and inserting a plug into each end of the tube between the respective bodies and the plugs, to seal the plugs against the interior of the clamped peripheral wall portions of the tube.

8. The method of claim 7 wherein the step of positioning each of the ends of the tube in a body comprises, positioning each end in the body of a mold end assembly.

9. The method of claim 1 wherein the step of removing the tube from the mold body comprises gripping one end of the tube, and applying an axial pull sufficient to stretch the tube as it is pulled from the mold body.

10. The method of claim 9 wherein the step of gripping one end of the tube comprises, positioning the one end of the tube in a body having a frustoconical interior surface, and inserting a plug into the tube to clamp a peripheral wall portion of the tube between the frustoconical interior surface of the body and the plug, and simultaneously pulling the plug and body axially of the mold to pull the tube out of the mold body.

11. The method of claim 1 wherein the mold body is a continuous unitary body which is not disassembled during removal of the tube from the mold body.

12. The method of claim 1 wherein the step of positioning the tube in a mold body comprises, positioning the tube in a thin walled corrugated tubular mold body.

* * * * *

UNITED STATES PATENT AND TRADEMARK OFFICE
CERTIFICATE OF CORRECTION

PATENT NO. : 4,957,687

DATED : September 18, 1990

INVENTOR(S) : AKMAN ET AL

It is certified that error appears in the above-identified patent and that said Letters Patent is hereby corrected as shown below:

On the title page, the assignee should be identified as follows:

--Societe Anonyme Dite: Compagnie Plastic Omnium, Lyon, France--.

Signed and Sealed this

Third Day of November, 1992

Attest:

DOUGLAS B. COMER

*Attesting Officer*    *Acting Commissioner of Patents and Trademarks*